United States Patent [19]

Cook

[11] Patent Number: 4,632,955

[45] Date of Patent: Dec. 30, 1986

[54] EMULSIFIABLE POLYETHYLENE PARAFFIN BLEND COMPOSITION

[75] Inventor: Gregory A. Cook, Longview, Tex.

[73] Assignee: Eastman Kodak Company, Rochester, N.Y.

[21] Appl. No.: 792,073

[22] Filed: Oct. 28, 1985

[51] Int. Cl.$^4$ .......................... C08K 5/01; C08L 91/06
[52] U.S. Cl. .................... 524/275; 524/276; 524/585
[58] Field of Search ................. 524/275, 276

[56] References Cited

U.S. PATENT DOCUMENTS

| | | | |
|---|---|---|---|
| 2,874,137 | 2/1959 | Pisanchyn et al. | 524/276 |
| 2,879,239 | 3/1959 | Groote et al. | 524/275 |
| 2,879,240 | 3/1959 | Groote et al. | 524/275 |
| 2,879,241 | 3/1959 | Groote et al. | 524/275 |
| 2,943,069 | 6/1960 | Rosenbaum | 524/275 |
| 2,952,649 | 9/1960 | McCall et al. | 524/275 |
| 3,367,999 | 2/1968 | Steierman | 524/275 |

FOREIGN PATENT DOCUMENTS

| | | | |
|---|---|---|---|
| 605495 | 9/1960 | Canada | 524/276 |
| 965833 | 8/1964 | United Kingdom | 524/276 |

*Primary Examiner*—Herbert J. Lilling
*Attorney, Agent, or Firm*—William P. Heath, Jr.; J. Frederick Thomsen

[57] ABSTRACT

This invention relates to novel emulsifiable polyethylene paraffin blend compositions, the blend compositions having a viscosity of about 95 to 2,600 cp at 150° C. and an acid number of about 15 to 17 milligrams KOH/gm, said blend composition comprising (a) about 35 to 47 weight % of an ether soluble fraction having a viscosity of about 1 to 20 cp at 125° C. and a density of 0.895 to 0.900 g/cc: (b) about 33 to 39 weight % of a hexane soluble fraction having a viscosity of 1,300 to 4,000 cp at 125° C. and a density of 0.938 to 0.941 g/cc; and (c) about 20 to 26 weight % of a hexane insoluble fraction having a viscosity of 12,000 to 100,000 cp at 150° C. and a density of 0.939 to 0.946 g/cc.

3 Claims, No Drawings

EMULSIFIABLE POLYETHYLENE PARAFFIN BLEND COMPOSITION

This invention relates to emulsifiable polyethyleneparaffin blend compositions. The blends of this invention are particularly useful for preparing emulsions for use in floor polish compositions. Floor polishes utilizing the blend compositions of this invention exhibit a hard wax finish having a high gloss, are easily rebuffable, exhibit light transmittance values of at least 75 percent, and have good slip resistance.

Water emulsifiable polyethylene waxes are widely used as self-polishing waxes in commerical applications. These waxes are relatively easy to use, are inexpensive, and provide good results. The waxes, in addition to being used in self-polishing wax formulations in floor polish applications, are also useful in formulating textile finishes, paper coatings, and the like.

A process for oxidizing blends of specific polyethylene components and a specific microcrystalline wax is disclosed in U.S. Pat. No. 2,879,239. The products produced by the process are said to be especially valuable for the preparation of emulsions which, when spread on a surface, leave hard, tough films having a high gloss.

In accordance with the present invention, I provide emulsifiable polyethylene-paraffin blend compositions, said blend compositions having a viscosity of about 95 to 2,600 cp at 150° C. and an acid number of about 15 to 17 milligrams KOH/gm, said blend composition comprising (a) about 35 to 47 weight % of an ether soluble fraction having a viscosity of about 1 to 20 cp at 125° C. and a density of 0.895 to 0.900 g/cc; (b) about 33 to 39 weight % of a hexane soluble fraction having a viscosity of 1,300 to 4,000 cp at 125° C. and a density of 0.938 to 0.941 g/cc; and (c) about 20 to 26 weight % of a hexane insoluble fraction having viscosity of 12,000 to 100,000 cp at 150° C. and a density of 0.939 to 0.946 g/cc.

The following is a description of the procedure for separating fractions of cooxidized polyethylene-paraffin blend compositions. Two 100-gram portions of powdered (30 mesh) cooxidized wax are extracted with hexane for 48 hours in a jacketed soxhlet extractor. The hexane insoluble fraction is washed with acetone and dried in a vacuum oven at 40° C. The hexane extract is concentrated to dryness and powdered. The powder is then extracted with diethyl ether for 48 hours. The ether soluble material is isolated by evaporation of the ether in vacuo at 25° C. The hexane soluble/ether insoluble fraction is washed in acetone and dried in a vacuum oven at 40° C.

A process for preparing the water emulsifiable polyethylene-paraffin blend compositions of this invention comprises (a) preparing a blend of (1) 55 to 30 weight % low density polyethylene having a melt index of about 10 to 165, a density of about 0.915 to 0.930 and about 2.2 to 4.0 methyl groups per 100 carbon atoms; (2) 20 to 50 weight % low density polyethylene wax having a molecular weight of less than 12,000, a density of 0.900 to 0.914, a melt index of 200 to 4,200 and 4.0 to 7.0 methyl groups per 100 carbon atoms; and (3) 5 to 45 weight % paraffin wax having a melting point of about 40° C. to 75° C., and (b) oxidizing said blend at a temperature of about 135° C. to 190° C. to an acid number of about 15 to 17 milligrams KOH/gm.

The low density polyethylenes useful in this invention have densitites between about 0.916 g/cc and 0.93 g/cc and melt indices of between about 10 dg/min and 165 dg/min. The preferred low density polyethylenes have densities between about 0.920 g/cc and 0.926 g/cc and melt indices of between about 18 dg/min and about 42 dg/min. These low density polyethylenes may be prepared by polymerizing relatively high purity ethylene obtained from a natural gas cracking plant, in a stirred reactor at pressures above about 1,000 atmospheres and temperatures above about 200° C. using a peroxide type of catalyst such as di-tertiarybutyl peroxide. Lower purity ethylene containing inerts such as methane, ethane, carbon dioxide and the like may be introduced into the ethylene feed to modify the purity of the ethylene and hence the MIR of the final product which has been found to be a function of the reactor feed purity. Publications which give further general details of the preparation of low density polyethylenes are the text *Polythene* by Renfrew and Morgan, pp. 11–17, and the article in *Petroleum Refiner*, 1956, p. 191, by Thomasson, McKelta and Ponder.

Low density polyethylene waxes that are non-emulsifiable in water are useful in the practice of this invention. Nonemulsifiable polyethylene waxes which are particularly suited for use in the practice of this invention are the hydrocarbon waxes that are prepared by the polymerization of ethylene to form a polymer having a molecular weight in the wax range or by thermally degrading a plastic-grade polyethylene; for example, polyethylene having a molecular weight in the range of about 10,000 to about 30,000 to a molecular weight in the wax range. The preferred low density polyethylene waxes have densities between about 0.902 and 0.910 g/cc.

The paraffin waxes useful in this invention are waxes having a melting point of about 40° C. to 75° C., preferably 52° C. to 64° C., which are obtained during petroleum refining processes. Such waxes are well known in the art and are readily available commercially.

The polyethylenes and paraffin wax are blended by suitable means known in the art such, for example, as heated tumblers, blenders and extruders and the like. The molten blend can then be oxidized in a suitable apparatus by passing an oxygen containing gas, such as air, into the blend at a temperature of less than about 135° C. to 190° C., preferably 150° C. to 175° C., to obtain an oxidized blend having the desired acid number. The oxidized blend can, if desired, be stabilized with conventional commercially available stabilizers. These oxidized blends are readily emulsifiable by processes well known in the art such as water-to-wax and wax-to-water techniques. These emulsions are generally prepared using well-known emulsifiers or surfactant and a base, water and the oxidized blend.

This invention can be further illustrated by the following examples of preferred embodiments, although it is understood that these examples are included merely for purposes of illustration and are not intended to limit the scope of the invention unless otherwise specifically indicated.

EXAMPLE 1

About 245 grams (35 percent) of a low density polyethylene having a melt index of 35 to 41, an annealed density of 0.922 to 0.925 g/cc and a Vicat softening point of 86° to 95° C., is blended with about 280 grams (40 percent) of a low density polyethylene wax having a melt index of 200 to 210, a density of 0.906 to 0.910 g/cc, penetration hardness of 2.5 to 2.9 dmm, and Ring and Ball softening point of 109° C. to 111° C., and about 175 grams (25 percent) of a 50° to 66° C. melting point paraffin composed of 90 percent normal paraffins and containing 0.5 percent oil or less. The resulting three-component blend has a viscosity of 34,000 to 36,000 cp at 150° C. and a density of 0.919 to 0.921 g/cc. The initial blend viscosity is reduced in a preoxidation step involving extrusion of the blend into a continuous, three-stage, stirred-tank reactor at 150° C. to 175° C. and 100 to 400 psig air pressure. A residence time of 30 to 60 minutes is required to produce a 4 to 7 acid number product with a melt viscosity of 3,000 to 6,000 cp at 130° C. The preoxidized product is subsequently oxidized in a continuous, staged, tubular reactor at 150° C. and 120 psig air pressure. A 2 to 3 hour residence time is required to obtain a 16 acid number product having a melt viscosity of 700 to 850 cp at 125° C., Ring and Ball softening point of 97° C. to 100° C., penetration hardness of 2.6 to 3.3 dmm, density of 0.937 to 0.942 g/cc, and Gardner Color of 1.

The product from this Example comprises 26.5% hexane insoluble fraction, 38.6% hexane soluble fraction, and 34.9% ether soluble fraction. The hexane insoluble fraction exhibited a viscosity of 27,500 cp at 150° C. and a density of 0.941 g/cc. The hexane soluble fraction had a viscosity of 2,090 cp at 125° C. and a 0.940 g/cc density. The ether soluble fraction had a viscosity of 10 cp at 125° C.

The oxidized wax is emulsified by a conventional wax-to-water method at atmospheric pressure. A typical nonionic emulsion recipe is 40 parts wax, 12 parts nonionic surfactant, 1 part KOH (85%), and 156 parts deionized water. The percent light transmittance measured on a 1 percent solids emulsion is 78 to 86. The cooxidized wax composition was found to impart excellent slip resistance to a low wax content floor polish.

EXAMPLE 2

About 245 grams (35 percent) of a low density polyethylene is blended with about 245 grams (35 percent) of a low density polyethylene wax having a viscosity of 3800 to 4400 cp at 150° C., density of 0.901 to 0.904 g/cc, and penetration hardness of 4.2 to 5.8 dmm, and about 210 grams (30 percent) of a 50° C. melting point paraffin containing 0.5 percent oil or less. The resulting three-component blend has a viscosity of 6,000 to 6,500 cp at 150° C. and a density of 0.914 to 0.916 g/cc. Oxidation of the blend is carried out in a 2-liter autoclave at 150° C., 100 psig air pressure, and 3.0 liters/minute air flow. A ⅓ horsepower motor is used to pull the stirrer at 800 rpm. A residence time of 2.5 to 3.5 hours is required to obtain a 16 acid number product having a viscosity of 240 to 320 cp at 125° C., Ring and Ball softening point of 95° C. to 98° C., penetration hardness of 4.5 to 5.5 dmm, density of 0.930 to 0.934 g/cc, and Gardner Color of 1.

The product from this example comprised 20.2% hexane insoluble fraction, 33.0% hexane soluble fraction, and 46.8% ether soluble fraction. The hexane insoluble fraction exhibited a viscosity of 12,000 cp at 150° C. and a density of 0.946 g/cc. The hexane soluble fraction had a viscosity of 1,440 cp at 125° C. and a density of 0.941 g/cc. The ether soluble fraction exhibited a viscosity of 7.5 cp at 125° C. and a density of 0.898 g/cc. The product exhibited excellent emulsifiability (80 to 88 percent light transmittance) and imparted improved slip resistance to low and medium wax content floor polishes.

EXAMPLE 3 (Comparative)

About 525 grams (75 percent by weight) of a low density polyethylene having a melt index of 19 to 23, annealed density of 0.923 to 0.925 g/cc, and a Vicat softening point of 86° C. to 95° C. is blended with about 175 grams (25 percent) of a 50° C. to 66° C. melting point paraffin. The resulting two-compartment blend has a viscosity of 85,000 to 90,000 cp at 150° C. and a density of 0.922 to 0.925 g/cc. Oxidation of the blend is carried out using a procedure similar to that described in Example 1 to produce a 16 acid number product with a viscosity of 800 to 950 cp at 125° C., Ring and Ball softening point of 102° C. to 104° C., penetration hardness of 2.0 to 2.6 dmm, density of 0.939 to 0.942 g/cc, and Gardner Color of 1. Although the product exhibited excellent emulsifiability (75 to 82 percent light transmittance), it imparted poor slip resistance to low and medium wax content floor polishes.

EXAMPLE 4 (Comparative)

About 420 grams (60 percent) of a low density polyethylene is blended with about 280 grams (40 percent) of a 50° C. melting point paraffin containing 0.5 percent oil or less. The resulting blend has a viscosity of 17,500 to 18,000 cp at 150° C. and a density of 0.918 to 0.920 g/cc. Oxidation to a 16 acid number is achieved using the procedure described in Example 3. The product has a viscosity of 205 to 260 cp at 125° C., Ring and Ball softening point of 101° C. to 102° C., penetration hardness of 4.0 to 4.5 dmm, density of 0.938 to 0.941 g/cc, and Gardner Color of 1. The product exhibited excellent emulsifiability (79 to 84 percent light transmittance) but imparted poor slip resistance to low and medium wax content floor polishes.

EXAMPLE 5 (Comparative)

About 448 grams (64 percent) of a 50° C. melting point paraffin is blended with about 168 grams (24 percent) low density polyethylene and 84 grams (12 percent) low density polyethylene wax and cooxidized to a 17.9 acid number according to a procedure described in Example 3. The product has a viscosity of 28.0 cp at 125° C., Ring and Ball softening point of 94.0° C., penetration hardness of 17 dmm, density of 0.922 g/cc, and Gardner Color of 1. Because of its low viscosity and high penetration hardness, the experimental wax is not useful in floor polish or textile applications. This composition is comparable to Point B shown in U.S. Pat. No. 2,879,239.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. Emulsifiable polyethylene-paraffin blend compositions, said blend compositions having a viscosity of about 95 to 2600 cp at 150° C. and an acid number of about 15 to 17 milligrams KOH/gm, said blend composition comprising
   (a) about 35 to 47 weight % of an ether soluble fraction having a viscosity of about 1 to 20 cp at 125° C. and a density of 0.895 to 0.900 g/cc;
   (b) about 33 to 39 weight % of a hexane soluble fraction having a viscosity of 1300 to 4000 cp at 125° C. and a density of 0.938 to 0.941 g/cc; and (c) about 20 to 26 weight % of a hexane insoluble fraction having a viscosity of 12,000 to 100,000 cp at 150° C. and a density of 0.939 to 0.946 g/cc.

2. Emulsifiable polyethylene paraffin blend composition of claim 1, wherein said ether soluble fraction is present in the amount of about 35 weight %, said hexane soluble fraction is present in the amount of about 39 weight %, and said hexane insoluble fraction is present in the amount of about 26 weight %.

3. Emulsifiable polyethylene-paraffin blend compositions of claim 1 wherein said either soluble fraction is present in the amount of about 47 weight %, said hexane soluble fraction is present in the amount of about 33 weight %, and said hexane insoluble fraction is present in the amount of about 26 weight %.

* * * * *